Patented Jan. 8, 1946

2,392,574

UNITED STATES PATENT OFFICE 2,392,574

ADHESIVES

Charles F. Brown, Grosse Pointe Park, Mich., assignor to United States Rubber Company, New York, N. Y., a corporation of New Jersey No Drawing. Application February 13, 1943, Serial No. 475,794

9 Claims. (Cl. 154—43)

This invention relates to improvements in adhesives, and more particularly to certain thermosetting adhesive compositions containing a partially hydrolyzed polyvinyl ester, for bonding rubber-like materials derived from partially hydrolyzed polyvinyl esters, to other surfaces.

An object of the invention is to provide such an adhesive which can be used specially for bonding said rubber-like compositions to fibres (cloth, cord, wood, paper, etc.) and materials other than rubber and certain synthetics such as neoprene, Thiokol, Perbunan, etc., as well as to the composite articles which are bonded together by such means. The present adhesives are not very effective as to rubber and certain synthetic rubbers as described. Other objects will be apparent from the following description.

Broadly, the adhesive compositions comprise a partially hydrolyzed polyvinyl ester, i. e., a partially hydrolyzed polymer of a polymerizable ester of a carboxylic acid, such as partially hydrolyzed polyvinyl acetate, a heat-hardenable phenolic resin, an oxidizing chemical, and a solvent for the ester and resin components. An improved adhesive may be prepared by incorporating, with the aforesaid ester and resin, a plasticizer, a small amount of an inorganic oxidizing agent, ranging by weight from ½ to 5 parts, a water-insoluble organic amine in amounts of 2 to 10 parts, and carbon black such as channel black ranging from 5 to 100 parts, all aforesaid amounts being based by weight on 100 parts of the polyvinyl resin. If desired, a tackifying agent may be added, such as an alkyd or other tackifying resin; also a methylene-containing hardening agent for the phenolic resin.

In a modification of the invention, an adhesive which gives excellent bonding strength between the said particular rubber-like compositions and metal surfaces, and which is not affected by heat, solvents, or ageing, comprises in addition to the solution containing the partially hydrolyzed polyvinyl ester and a heat-hardenable phenolic resin, a methylene-containing hardening agent, and red iron oxide. In a preferred modification of this latter mentioned adhesive, there is also added a small amount of an inorganic oxidizing agent such as lead chromate, ranging by weight from ½ to 2½ parts per 100 parts of the polyvinyl resin, and a basic oxide such as magnesium oxide in the same range as for the oxidizing agent. Other oxidizing agents such as lead peroxide, yellow mercuric oxide, potassium permanganate may also be used.

The phenolic resins are of the type that are alcohol- and acetone-soluble and are potentially reactive, such as certain phenol-aldehydes and alcohol-modified phenol-aldehydes, including resorcinol-formaldehyde resins, and phenol-formaldehyde or Bakelite resins, which are in a low state of polymerization and hence highly reactive. Such resins are first characterized in that they do not set to a hard film at ordinary room temperatures but remain relatively soft and pliable. When adding the resins, or mixtures of resins, they are preferably added in alcohol or acetone solution, for example, solutions of about 50% total solids concentration. For general adhesive purposes, the reactive phenolic resin is preferably used in amounts varying from 10 to 100 parts by weight per 100 parts of the partially hydrolyzed polyvinyl ester; for special purposes, as for bonding to metal, the proportions of the phenolic resin may be much higher.

The substances such as formaldehyde which liberate reactive methylene groups for aiding in the polymerization of the phenolic resin are preferably used in a proportion of from about 1 to 20 parts by weight per 100 parts by weight of the reactive resin. Among such substances are formaldehyde, paraformaldehyde, hexamethylene tetramine (hexa), or equivalent substances.

The partially hydrolyzed polyvinyl ester resins that may be used may be varied from 50% to 90% hydrolyzed. The best results are obtained from the grades where 50% of the polyvinyl acetate residues have been substituted to form hydroxyl groups in the polymer, for example, in the case of partially hydrolyzed polyvinyl acetate the 50% would correspond to the polyvinyl alcohol part of the polymer molecule or aggregate. Physical mixtures containing polyvinyl acetate and polyvinyl alcohol as separate entities have not been found satisfactory in the present invention.

In the adhesive which is especially useful for bonding to metal surfaces, the presence of red iron oxide plays a major role, and it may be used in proportions by weight ranging from 50% to 200% or higher, based on the partially hydrolyzed polyvinyl ester component. Carbon black may also be used but its influence in the adhesive is not as pronounced as the influence of the red iron oxide.

The preferred solvent that is used is a mixture of a monohydric alcohol and water. Alcohols particularly applicable are methyl, ethyl, butyl, etc., and whose evaporation rates are such as to be readily removed from the adhesive film by methods known to the art. This binary mixture allows for solution of the partially hydrolyzed polyvinyl resin because of the water present in the solution. The amount of water may range from as low as 5 to as high as 50% by weight of the solvent, a preferred mixture being one in which equal weights of the alcohol and water are used.

The partially hydrolyzed polyvinyl ester may or may not be one that has been specially prepared or compounded before inclusion in the solution. For the purpose of the present invention it is preferred to use such a prepared partially hydrolyzed polyvinyl ester as admixed and disclosed in patent application of James D. Quist, Serial No. 422,722, filed December 12, 1941, now U. S. Patent No. 2,362,026, issued on November 7, 1944.

Such a preferred composition, in which the parts are by weight, is:

| | |
|---|---|
| 50% hydrolyzed ester | 60 |
| Glycerol | 40 |
| Sodium dichromate | 1.5 |
| Channel black | 5 |
| Phenyl-beta naphthylamine | 5 |

This mixture is dissolved in the solvent by any suitable method known to the art for making cements, and preferably to an extent that the total solid content of cement is about 20% by weight.

The proportions of the basic ingredients in the adhesive may be varied over a rather wide range without seriously affecting the efficiency of the adhesive. A general recipe may be stated thus, in which the parts are by weight:

| | |
|---|---|
| 50% hydrolyzed resin composition as above | 100 |
| Reactive phenolic resin | 10–100 |
| Solvent in amounts to give 10–30% solids. | |

The solutions of the various resins are mixed together, preferably by means of a high speed mechanical stirrer.

The following examples are given to illustrate the merits of the adhesive where used for bonding fabric such as cotton duck to a rubber-like composition derived from a partially hydrolyzed polyvinyl ester such as described in said Quist application, and in my co-pending application Serial No. 475,793, filed February 13, 1943, now U. S. Patent No. 2,381,720, issued on August 7, 1945.

| | A | B | C | D | E | F |
|---|---|---|---|---|---|---|
| 50% hydrolyzed polyvinyl ester composition | 100 | | 90 | 50 | 20 | 50 |
| Bakelite BR-6741 | | 100 | 10 | 50 | 80 | |
| Bakelite BR-5948 | | | | | | 50 |
| Adhesive bond | Very poor | Very poor | Good | Excellent | Poor | Excellent |

The above examples were pressure cured 30 minutes at 265° F. Examples A and B gave separation when removed hot from the mold. Example C was removed hot and gave no indications of failure in the adhesive after cooling, the fabric being stripped away with difficulty; soaking in water however weakens the adhesive bond. Examples D and F were removed hot and gave no indications of failure or distortion. Soaking in water, and organic solvents, showed no effect on the adhesive bond, failure occurring in the stock rather than the adhesive layer. The test pieces were quite flexible before and after soaking. Example E gave separation at the adhesive-stock interface showing the effects of excessive proportions of resin in the adhesive. The sample was quite stiff. The phenolic resin content is preferably not higher by weight than 200 parts per 100 parts of the polyvinyl resin in the adhesive for fibrous materials.

Composition D containing 25 parts alcohol-soluble alkyd (adipic acid-triethylene glycol) per 100 parts of polyvinyl ester composition, was put on wood and the cemented surfaces plied together. The composite article was heated in the air 4 hours at 200° F. without pressure. The adhesive bond was good and gave no failure when soaked in water for 3 days.

Coatings of composition D were put on plywood and subjected for 20 minutes to steam at 285° F. The coatings so produced were quite adherent and showed no change in solvents.

In making the composite article the fabric is treated with the adhesive composition and dried. The drying temperatures should be preferably between 240° F. and 275° F., and is for the purpose of partially setting the reactive phenolic resin. A proper state of reactivity or set-up of the resin is at the point where tackiness has just disappeared from the adhesive film when cool. The rubber-like composition which is to be bonded to the fabric is then cured against the adhesive-coated surface with heat, and preferably pressure. The bond so formed between the rubbery material and the fabric is quite strong since failure usually occurs in the portions outside of the adhesive layer.

The reason for giving the pre-heat treatment to the adhesive composition is to prevent the water which is given off during the condensation from being entrapped in the composite article and in that way producing undesired porosity. However, in the production of composite articles such as ply wood, fibre board, and the like, such pre-heating is not necessary for obtaining good results.

In a modification of the invention pertaining particularly to adhesives that are excellent for bonding to metal, the particular rubbery materials derived from partially hydrolyzed polyvinyl esters, such as described in my co-pending application Serial No. 475,793, and said Quist application, the following is a representative general formula for such adhesives, the parts being by weight:

| | |
|---|---|
| 50% hydrolyzed polyvinyl ester composition | 20–80 |
| Reactive phenolic resin | 100 |
| Red iron oxide | 10–150 |
| Hardening agent | 2–20 |

Solvent in amount to give 15–50% total solids. In this instance also, the polyvinyl ester composition may be one such as prepared in the aforesaid referred to patent application of James D. Quist.

The reactive phenolic resin and iron oxide are dispersed in alcohol by means of a high speed stirrer so as to assure good dispersion of the iron in the mixture. The hexa is dissolved in an amount of water equal to the weight of the hexa and this solution is added to the resin mixture. This mixture is used as the base coat, where such a base coat is necessary, and also in the preparation of the adhesive mixture itself. The general formula for this base coat, in which the parts are by weight, is as follows:

| | |
|---|---|
| Reactive phenolic resin | 100 |
| Red iron oxide | 10–150 |
| Hexa | 2–20 |
| Ethyl alcohol in amount to give 20–70% total solids. | |

The finished adhesive is prepared by mixing together the solutions of the partially hydrolyzed polyvinyl ester composition and of the reactive phenolic resin. The inorganic oxidizing agent and the basic oxide are preferably added to the adhesive mixture in the form of an aqueous paste.

The metal surface is cleaned in any approved manner and a coat of the base cement is applied. The base coat is dried and baked at temperatures in excess of about 275° F. until the resin is completely set, usually in about ½ hour. The adhesive cement is then applied to this base, dried, and then given a partial bake for about 15 minutes at 250-275° F. The rubbery material derived from a hydrolyzed polyvinyl ester is then cured against the prepared adhesive surface with the aid of heat and pressure for about 30 minutes at 275° F. The adhesive bond is now set and is no longer thermoplastic and the article may thereupon be removed from the mold without cooling.

It is not necessary in all cases to use a base coat and this may be found expedient as desired.

The following are specific examples pertaining to bonding of the rubbery material on aluminum:

|  | G | H | I | J | K | L | M | N | O |
|---|---|---|---|---|---|---|---|---|---|
| 50% hydrolyzed polyvinyl ester composition | 100 |  | 100 | 100 | 100 | 25 | 200 | 100 | 100 |
| Bakelite-6741 |  | 100 | 100 | 100 | 100 | 100 | 100 | 100 | 100 |
| Red iron oxide |  |  | 125 | 125 | 125 | 125 | 125 | 125 | 125 |
| Hexa |  |  | 10 | 10 | 10 | 10 | 10 | 10 | 5 | 20 |
| Lead chromate |  |  | 5 | 5 |  | 5 | 5 | 5 | 5 | 5 |
| Magnesium oxide |  |  | 5 | 5 |  | 5 | 5 | 5 | 5 | 5 |
| Adhesion (lbs./sq. in.) | N. G. | N. G. | 600 | 300 | ¹ 350 | 200 | 200 | 300 | 200 |

¹ Variable up to 350.
All examples except K have the base coat as previously described.

Examples G and H gave no adhesive bond in the cured sample. Example G failed at the base-adhesive interface while Example H failed at the adhesive-stock interface. Example I shows the startling results of the combination of ingredients. Example J shows the effect of not adding the inorganic oxidizing agent and basic oxide. Example K shows the erratic results obtained without the base coat. Examples L and M show the effect of varying the proportions of polyvinyl ester composition, while Examples N and O show the effects of varying the hexa content.

The adhesive compositions of the present invention may be used in the production of various articles including belting, tires, hose, fibre board, plywood, wearing apparel, mechanical goods, etc., the adhesive for bonding to metals being also useful in bonding the rubbery composition to other surfaces such as glass, wood, etc., and in producing various metal-stock bonds in articles such as motor mountings, grommets, solid tires, etc.

While I have herein disclosed with particularity certain preferred manners of performing my invention, I do not desire to limit myself solely thereto, because the precise proportions of the materials utilized can be varied without departing from the spirit and scope of the invention as defined in the appended claims.

Having thus described my invention, what I claim and desire to protect by Letters Patent is:

1. A thermosetting adhesive composition for bonding rubber-like materials derived from partially hydrolyzed polyvinyl esters to other surfaces, which comprises, by weight, 100 parts of a partially hydrolyzed polyvinyl acetate which is at least about 50% and not more than about 90% hydrolyzed between 10 and 200 parts of a heat-hardenable phenol-aldehyde resin, a methylene-containing hardening agent for the reactive phenol-aldehyde resin, 50-200 parts of red iron oxide, about .5 to about 5 parts of an inorganic oxidizing agent selected from the class consisting of lead chromate, yellow mercuric oxide, lead peroxide, potassium permanganate, and alkali-metal dichromate, about .5 to about 5 parts of an alkaline-earth metal oxide, and a solvent for the acetate and the phenol-aldehyde resin.

2. A composite article comprising a layer of a rubber-like material derived from a partially hydrolyzed polyvinyl ester, a layer of another material, and an adhesive coating intermediate said layers, said adhesive coating comprising, by weight, 100 parts of a partially hydrolyzed polyvinyl acetate which is at least about 50% and not more than about 90% hydrolyzed, 50-200 parts of red iron oxide, and between 10 and 200 parts of a heat-hardened-in-situ phenol-aldehyde resin.

3. A composite article comprising a layer of a rubber-like material derived from a partially hydrolyzed polyvinyl ester, a layer of another material, and an adhesive coating intermediate said layers, said adhesive coating comprising, by weight, 100 parts of a partially hydrolyzed polyvinyl acetate which is at least about 50% and not more than about 90% hydrolyzed, 50-200 parts of red iron oxide, about .5 to about 5 parts of an inorganic oxidizing agent selected from the class consisting of lead chromate, yellow mercuric oxide, lead peroxide, potassium permanganate, and alkali-metal dichromate, and between 10 and 200 parts of a heat-hardened-in-situ phenol-aldehyde resin.

4. A composite article comprising a layer of a rubber-like material derived from a partially hydrolyzed polyvinyl ester, a layer of another material, and an adhesive coating intermediate said layers, said adhesive coating comprising, by weight, 100 parts of a partially hydrolyzed polyvinyl acetate which is at least about 50% and not more than about 90% hydrolyzed, 50-200 parts of red iron oxide, about .5 to about 5 parts of an inorganic oxidizing agent selected from the class consisting of lead chromate, yellow mercuric oxide, lead peroxide, potassium permanganate, and alkali-metal dichromate, about .5 to about 5 parts of an alkaline-earth metal oxide, and between 10 and 200 parts of a heat-hardened-in-situ phenol-aldehyde resin.

5. A composite article comprising a layer of a rubber-like material derived from a partially hydrolyzed polyvinyl ester, a layer of another material, and an adhesive coating intermediate said layers, said adhesive coating comprising, by weight, 100 parts of a partially hydrolyzed polyvinyl acetate which is at least about 50% and not more than about 90% hydrolyzed, 50-200 parts of red iron oxide, about .5 to about 5 parts of lead chromate, about .5 to about 5 parts of magnesium oxide, and between 10 and 200 parts of a heat-hardened-in-situ phenol-aldehyde resin.

6. A composite article comprising a layer of a rubber-like material derived from a partially hydrolyzed polyvinyl ester, a layer of metal having a phenolic resin base coat, and an adhesive coating intermediate said layers, said adhesive coating comprising, by weight, 100 parts of a partially hydrolyzed polyvinyl acetate which is at least about 50% and not more than about 90% hydrolyzed, 50-200 parts of red iron oxide, about .5 to about 5 parts of lead chromate, about .5 to about 5 parts of magnesium oxide, and between 10 and 200 parts of a heat-hardened-in-situ phenol-aldehyde resin.

7. A thermosetting adhesive composition comprising, by weight, 100 parts of a 50-90 percent hydrolyzed polyvinyl acetate, between 10 and 200 parts of a heat-hardenable phenol-aldehyde resin of the alcohol- and acetone-soluble type, about .5 to about 5 parts of an inorganic oxidizing agent selected from the class consisting of lead chromate, yellow mercuric oxide, lead peroxide, potassium permanganate, and alkali-metal dichromate, about .5 to about 5 parts of an alkaline-earth-metal oxide, 50-200 parts of red iron oxide, a solvent for the ester component, and a solvent for the phenolic resin component.

8. A thermosetting adhesive composition comprising, by weight, 100 parts of a 50-90 percent hydrolyzed polyvinyl acetate, between 10 and 200 parts of a heat-hardenable phenol-aldehyde resin of the alcohol- and acetone-soluble type, about .5 to about 5 parts of lead chromate, 50-200 parts of red iron oxide, about .5 to about 5 parts of magnesium oxide, a solvent for the ester component, and a solvent for the phenolic resin component.

9. A thermosetting adhesive composition comprising, by weight, 100 parts of a 50-90 percent hydrolyzed polyvinyl acetate, between 10 and 200 parts of a heat-hardenable phenol-aldehyde resin of the alcohol- and acetone-soluble type, and about .5 to about 5 parts of an inorganic oxidizing agent selected from the class consisting of lead chromate, yellow mercuric oxide, lead peroxide, potassium permanganate, and alkali-metal dichromate, a solvent comprising 5 to 50 percent, by weight, of water, the remainder of the solvent being an evaporatable water-miscible solvent for the phenol-aldehyde resin component.

CHARLES F. BROWN.